United States Patent

[11] 3,588,709

[72] Inventor Robert C. Hoyler
Pittsburgh, Pa.
[21] Appl. No. 762,840
[22] Filed Sept. 26, 1968
[45] Patented June 28, 1971
[73] Assignee Westinghouse Electric Corporation
Pittsburgh, Pa.

[54] SYNCHRONOUS TIMING SYSTEM HAVING FAILURE DETECTION FEATURE
6 Claims, 5 Drawing Figs.

[52] U.S. Cl. .......... 328/63, 179/15, 307/269, 328/72
[51] Int. Cl. .......... H03k 17/00
[50] Field of Search .......... 307/269; 328/48, 63, 72, 155, 179; 178/69.5; 179/15 (SYNC)

[56] References Cited
UNITED STATES PATENTS

| | | | |
|---|---|---|---|
| 3,044,065 | 7/1962 | Barney et al. | 328/48X |
| 3,183,367 | 5/1965 | Van Berkel | 328/48X |
| 3,268,814 | 8/1966 | Du Vivier | 178/69.5X |

*Primary Examiner*—Stanley D. Miller, Jr.
*Attorneys*—F. H. Henson, R. G. Brodahl and M. F. Oglo

ABSTRACT: The invention encompasses a synchronous timing system of the type wherein a counter is "slaved" to a synchronization station by count pulses and reset signals. By providing a synchronization signal having one less pulse than the capacity of the counter, and using the absence of the pulse to provide the synchronization intelligence, the system has a built-in feature allowing detection of synchronization failure.

Patented June 28, 1971 3,588,709

2 Sheets-Sheet 1

SYNCHRONOUS TIMING SYSTEM HAVING FAILURE DETECTION FEATURE

CROSS-REFERENCE TO RELATED APPLICATION

The present application is related to a copending and commonly assigned application of Robert C. Hoyler and George M. Thorn-Booth, entitled "Control Of A Vehicle Along A Path Divided Into A Plurality Of Signal Blocks," (W.E. 39,222) Ser. No. 762,563, filed Sept. 25, 1968; the subject of that application being the larger organization of which the present invention is a component.

BACKGROUND OF THE INVENTION

This invention relates to synchronous timing systems of the type in which a remote counter is slaved to a synchronizing station by pulse count and reset signals, and more particularly to a construction of same which tends to automatically indicate failure of synchronism.

The cross-referenced copending application illustrates a use of a synchronous timing system in which proper operation of the synchronism is "vital." The system therein is sued in the multiplexing of train control signals to various signal block circuits of a track system. It can be shown that a failure in the synchronism of an individual multiplex receiving station therein could result in addressing signals to or from a wrong signal block circuit. The possible catastrophic effects of such wrongly addressed information includes possibility of collision of passenger trains with loss of life. Obviously, immediate detection of failure of synchronism is desired so that the attendant controls can initiate appropriate safety override measures.

A feature of the multiplex system disclosed in the cross-referenced application is that it employs signal structures of the form known as "commafree" binary codes. These codes are conventional and well-known in the art. They have an incidental advantage of ease of electronically distinguishing the presence of normal coded data from random binary data.

SUMMARY OF THE INVENTION

In a time division multiplex system, a synchronization line provides count pulses to control the counter which determines when an information line should be sampled. By providing a periodic waveform of count pulses having one less pulse than the capacity of the counter, and using the omitted pulse as the synchronization indicia, it is possible to provide for the detection failure of the synchronization. By counting the bit pulses, the receiving equipment can keep in step with the synchronization reference. If the reset fails, the counter will slowly drift causing detectable random information rather than undetectably locking to a possibly incorrect synchronization timing period.

The objectives of the present invention include provision of:

1. A synchronous counting system, which in the event of failure of the synchronism mechanisms inherently tends to go into a mode of operation in which immediate detection of failure of synchronism is possible.
2. A synchronous counting system in accordance with the preceding objective which is of special utility in a time-division multiplex system employing a binary signal structure of the "commafree" code-type, in that failure of synchronism can be detected at high electronic speeds.
3. A synchronous counter system in accordance with preceding objective which is simple in construction.

DESCRIPTION OF PREFERRED EMBODIMENT

Figure 3:
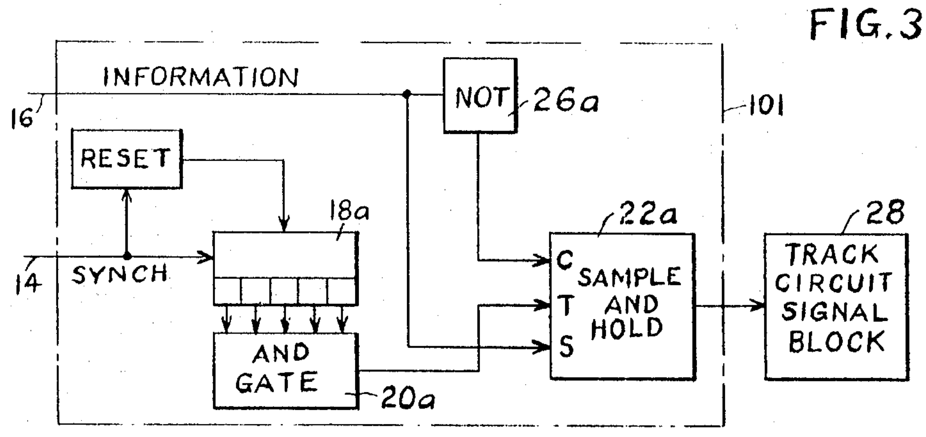
FIG. 3 is a detail of an individual receiving station in the system at FIG. 1.
Figure 1:
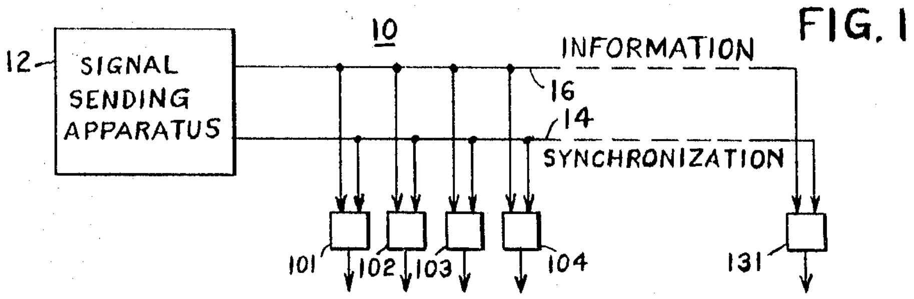
FIG. 1 is a block diagram of a multiplex system employing the present invention.

Referring now to the drawing, and particularly to FIGS. 1 and 3, the subject of the invention is a time-division multiplex system 10 of the type employing a receiving station counter which is synchronized to a sending station counter by means of a synchronizing signal.

Figure 2:
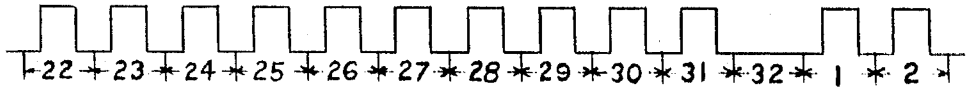
FIG. 2 is a portion of the waveform synchronization signal employed with the invention.

In accordance with the present invention the synchronizing signal is a periodic binary waveform having 32 regular time division periods or "time slots." A time slot pulse is present in the first 31 periods, but omitted in the 32nd. The waveform of such a signal is depicted in FIG. 2. The time slot pulse signals are shown in time division periods 22 through 31 out of the total of 32 time division periods with 32nd time slot pulse omitted as shown for system synchronization and reset purposes. The 1st and 2nd time slot pulses for the next successive multiplex cycle are also shown.

This synchronization signal originates in a signal sending apparatus 12, FIG. 1, and is coupled to 31 like receiving stations 101, 102—131 over a synchronization line 14. System 10 is basically the same arrangement as the signal sending apparatus for sending a train control signal to wayside stations in the referenced copending application. There the signal bit rate of the synchronizing signal is 576 signal bits per second. The multiplex signal sending apparatus 12 also sends an information signal, which is coupled by an information line 16, to each of the 31 multiplex receiving stations in a time division multiplex arrangement. Presence of a time slot pulse in a time division constitutes a bit of signal information representing a ONE state signal, and absence of a pulse represents a ZERO state signal. During the first time division period one bit of the information signal is sent for the first receiving station 101, for the next succeeding second time period one bit of the information signal sent for the second receiving station 102, and so forth until the 32nd time period when the absence of a time slot pulse serves to synchronize the operation of the signal transmission system. This signal containing 31 binary bits and a 32nd period corresponding to the reset time is the multiplex word. (It should be parenthetically noted that a circuit arrangement may be provided for utilizing the 32nd time division period). One way of generating the signal of FIG. 2 is disclosed in the referenced copending application (in connection with FIG. 9 thereof).

In FIG. 3 there is shown the synchronization line 14 and the information signal line 16 supplying information to the first multiplex receiving station 101. The synchronization line 14 supplies the signal waveform shown in FIG. 2 to a counter 18$a$, which is conventionally operative as a binary counter to count the successive signal bits. Counter 18$a$ comprises five flip-flop stages to provide a count level of 32. A sensor gate 20$a$ comprises, in effect, an AND circuit selectively connected to be responsive to a selected status of the counter. For the first receiving station 101, when the first time slot bit signal is received by the counter 18$a$, an output signal will be supplied by the selectively wired sensor gate 20$a$ to enable a sample and hold circuit 22$a$. Circuit 22$a$ is a conventional flip-flop and the signal from gate 20$a$ is applied to its clock input. The signal from gate 20$a$ enables it for obtaining whatever bit of information, either a ONE state or a ZERO state, is being transmitted during the first time slot position for station 101. A reset circuit 24$a$ is operative during the 32nd bit position to reset counter 18$a$ to a binary ZERO count (which is described in detail in the next paragraph). The information line 16 is directly coupled to the SET input of the flip-flop. A NOT circuit 26$a$ inverts the logic state introduced into the RESET input of circuit 22$a$ from information line 16 to insure proper operation of the flip-flop. The binary information obtained by sample and hold 22$a$ is subsequently transferred to the utilization circuit, which for example may be a track circuit signal block 28, as disclosed in the reference copending application.

In the transfer to the utilization circuit, suitable buffering is provided by means not forming a part of the present invention.

Figure 4:
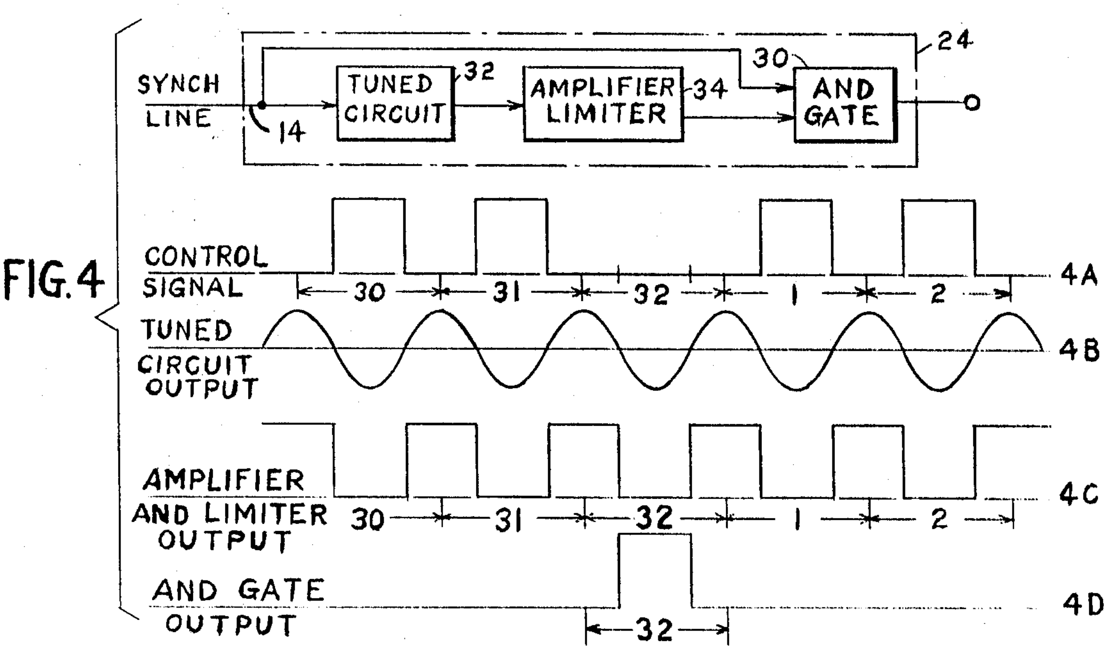
FIG. 4 is a block diagram of a detail of FIG. 3, including a family of waveforms illustrating its operation.

The detailed structure of reset 24 and waveforms illustrating its operation are shown in FIG. 4. The synchronization line 14 carries the synchronization signal shown in waveform 4A. This latter waveform is supplied to one input of an AND gate 30. The waveform 4A is also supplied to a tuned circuit 32, having a resonant frequency equal to the multiplex time division rate. As ringing of the tuned circuit causes the signal to continue through the missing 32nd time slot, as shown in waveform 4B. An amplifier 34, which includes a limiter circuit, provides waveform 4C. It should be noted at the position corresponding to the 32nd time slot signal having ZERO state in waveform 4A, there occurs a signal bit in waveform 4C. Due to the signal inversion which occurs because of signal delay and suitable polarity selection, the AND gate 30 senses similar signals only during the 32nd time division period to provide an output reset signal in waveform 4D only during the 32nd time division of synchronization waveform 4A.

Figure 5:
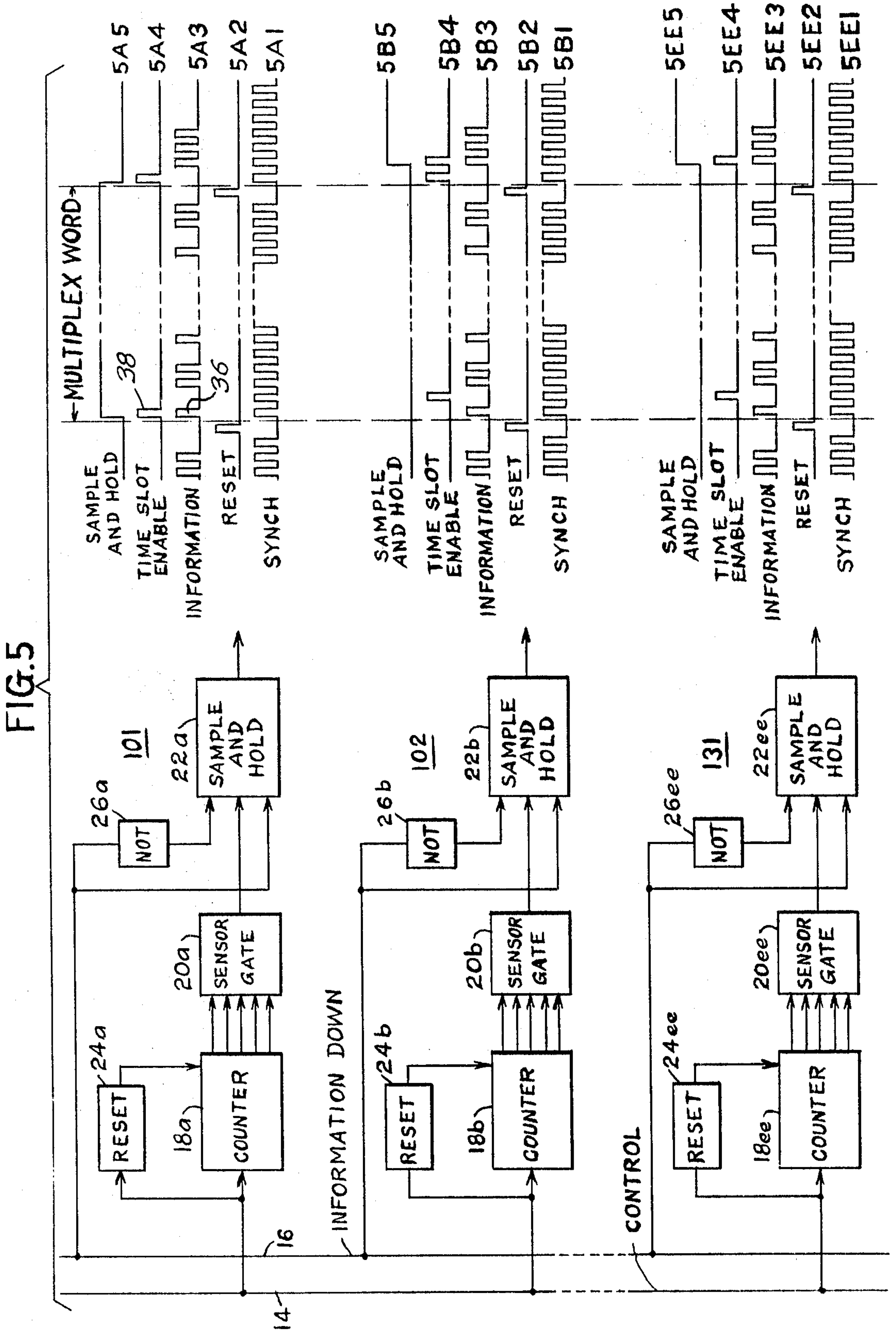
FIG. 5 is a block diagram of several of the receiving stations of the system in FIG. 1, including waveforms illustrating their operation.

The operation of multiplex system 10 in connection with receiving stations 101, 102—131 will now be described with reference to FIG. 5. Referring first to receiving station 101, it is assumed that sample and hold 22*a* is in its ZERO state prior to the start of the illustrated multiplex word period, as shown in waveforms 5A5. The signal bit of information from the information line, for example a ONE pulse 36 as shown by curve 5A3, during the first time slot is applied to the input of the sample and hold circuit 22*a*. The waveform 5A4 shows the time slot enable pulse 38 from the sensor gate 20*a*, which is selectively wired to be responsive only to the storage of a binary value of ONE, or 00001, in counter 18*a*. The sensor gate 20*a* operates in this regard in a manner similar to the well known function of an AND gate, sensing the ONE output of the first flip-flop stage and sensing the ZERO output of the other flip-flop stages. The time slot enable pulse 38 (waveform 5A4) for the first time division, is applied to enable the sample and hold circuit 22*a*. In function, circuit 22*a* is a flip-flop actuated by its clock input (center input arrow on left side) such that a sampling of the information signal bit carried by the information line 16, for example a ONE as shown by curve 5A3, occurs. The operation of the sample and hold 22*a* to provide the ONE output state, is shown in waveform 5A5. The reset circuit 24*a* provides the output waveform 5A2.

Referring now to receiving station 102, it is assumed that sample and hold 22*b* is in its ZERO state prior to start the multiplex word and that information line 16 contains a ZERO information signal at time slot two. This passes through the NOT circuit 26*b* to cause the sample and hold 22*b* to have a ZERO output signal at its output. Thusly, if a pulse is provided on the information line 16 for a given time slot position, the associated sample and hold is caused to have a high value output whereas if a ZERO (absence of pulse) condition occurs on the information line at a particular time slot position, due to the provided inversion NOT circuit, the associated sample and hold provides a ZERO or low output signal.

By the same mechanism, the sample and hold 22*ee* in receiving station 131 is changed from low to high state at the 31st time division period of the multiplex word.

Summarizing the operation, for each successive occurrence of the time slot enabling pulse applied by the sensor gate 20 to the sample and hold 22, the signal value on the information line 16 is thereby sampled, and if it is a ONE value signal a high level output is provided by the sample and hold 22. If the information line 16 has a ZERO value signal, the output of the sample and hold through operation of the NOT circuit 26 is changed to provide a low level output signal.

The reason for leaving the pulse out, rather than allowing the counter to count through 32 pulses and then reset, will now be understood. If the reset generating circuit should fail, a greater probability of detection of the failure is provided. There would be a precessional decrementing within the counter due to the counter's ability to count 32 pulses, but only 31 pulses being transmitted for each multiplex word. If the particular time division for the receiving station is the fifth, for the next cycle after failure of the reset the counter will enable the time slot four information and then time slot three and so forth. This will result in meaningless information. The invention is of particular utility in applications where the resultant meaningless information will be detected by a feedback comparison method, serving to indicate that the reset has failed. One example would be in the multiplexing of human speech. The system for signalling train control to track circuit signal blocks of the reference copending application is another, although more subtle, example. The coding disclosed therein is the conventional "commafree" binary code. During normal operation of a communication channel with this code, the coded information forms predetermined combinations of binary signal states. Simple arrangements of logic circuitry can be provided to electronically monitor the channel for the existence of this code. The precessional decrementing of a counter in a multiplex receiving station would result in random coded informed which would be immediately detected. The train control would interpret this as a failure of equipment and would safely stop operation of the train.

The present invention has been described with a certain degree of particularity. However, it should be understood that various modifications and changes can be made in the arrangement and operation of the individual parts without departing from the scope and spirit of this invention.

I claim:

1. Pulse signal apparatus synchronously responsive to a first periodic synchronization waveform comprising a sequence of N pulse divisions, where N is an integer, with a pulse in each of N−1 of the pulse divisions, and with the remaining pulse division having a predetermined sequential reference relationship to the sequence, said apparatus comprising a binary counter having a count level of N and adapted to advance in count in response to the pulses of the first synchronization waveform, said counter having a reset which is operative to set the counter to its zero count condition, means responsive to the N−1 pulses generated in said pulse signal apparatus for generating a second periodic waveform of N time divisions having a pulse in each time division period, and means for comparing said second periodic waveform and the first synchronization waveform to detect time coincidence with said remaining time division period.

2. Pulse signal apparatus synchronously responsive to a first periodic synchronization waveform comprising a sequence of N pulse divisions, where N is an integer, with a pulse in each of N−1 of the pulse divisions, and with the remaining pulse division having a predetermined sequential reference relationship to the sequence, said apparatus comprising, a binary counter having a count level of N and adapted to advance in count in response to the pulses of the synchronization waveform, said counter having a rest which is operative to set the counter to its zero count condition, a tuned circuit channel adapted to receive the synchronization waveform and having a resonant frequency corresponding to the periodicity of the pulse division periods thereof, said tuned circuit channel being operative to derive a waveform of N time division periods having a pulse in each time division period, and circuit means for comparing the derived waveform and the first synchronization waveform to detect time coincidence with said remaining time division period to activate said reset.

3. Apparatus in accordance with claim 5, wherein pulses which are in the N−1 time divisions are square wave in form relative to pulses in an adjacent time division period, with the tuned circuit channel for deriving a waveform of N time periods having a pulse in each time period comprising a tuned circuit followed by a limiting amplifier, including means for shifting the pulses at the output of the channel 180° in phase from the pulses at the input of the channel, said circuit means for comparing and detecting comprising an AND gate.

4. In combination: means for generating a first binary pulse train having N pulse divisions, where N is an integer, there being a pulse in each N−1 time divisions and no pulse in the Nth time division, a counter having a count level of N and which advances in count in response to the pulses in said first pulse train, first means responsive to the N−1 pulses in said first binary pulse train for generating a second binary pulse train of N time divisions and N pulses, and second means for resetting said counter in response to like binary levels in the Nth time division of each of said first and second binary pulse trains.

5. The combination claimed in claim 4 wherein the N pulses in said second binary pulse train are out of phase with respect to the N−1 pulses in said first binary pulse train.

6. The combination claimed in claim 4 further including a gate connected to said counter which produces a pulse in response to a predetermined count in said counter, means for generating information pulses, means capable of assuming two states, means for setting said means capable of assuming two states to a first state in response to time coincidence between an information pulse and the pulse from said gate, and means for setting said means capable of assuming two states to a second state in response to the absence of an information pulse.